United States Patent
van der Werff et al.

[11] Patent Number: 5,519,073
[45] Date of Patent: May 21, 1996

[54] PROCESS FOR THE PREPARATION OF A PHOSPHORIC-ACID-CONTAINING ASPHALT/POLYMER MIXTURE AND RESULTING ASPHALT COMPOSITION THEREOF

[75] Inventors: Johannes C. van der Werff, Sugarland; Son M. Nguyen, Houston, both of Tex.

[73] Assignee: Shell Oil Company, Houston, Tex.

[21] Appl. No.: 493,085

[22] Filed: Jun. 21, 1995

[51] Int. Cl.$^6$ .................. C08L 95/00; C08L 63/00
[52] U.S. Cl. .................. 524/62; 524/59; 525/54.5
[58] Field of Search .................. 106/273.1; 524/59, 524/61, 62; 525/54.5

[56] References Cited

U.S. PATENT DOCUMENTS

| | | | |
|---|---|---|---|
| 5,037,474 | 8/1991 | Mesch et al. | 106/273.1 |
| 5,306,343 | 4/1994 | Richardson, III et al. | 524/61 |
| 5,306,750 | 4/1994 | Goodrich et al. | |

*Primary Examiner*—Peter A. Szekely
*Attorney, Agent, or Firm*—Kimbley L. Muller

[57] ABSTRACT

A method of making an asphalt composition by mixing phosphoric acid with an asphalt base, resulting in an acid-asphalt mixture; blowing air through the acid-asphalt mixture, resulting in an acid-blown asphalt composition; mixing a terpolymer made from the concurrent reaction of ethylene, normal butyl acrylate, and glycidyl ester selected from glycidyl acrylate and glycidyl methacrylate according to U.S. Pat. No. 5,306,750, with the acid-blown asphalt composition, resulting in an glycidyl-functionalized polymer-containing acid-asphalt composition; and mixing an amine anti-strip additive with the glycidyl-functionalized polymer-containing acid-blown asphalt composition, resulting in a final asphalt composition; and recovering the final asphalt composition.

9 Claims, No Drawings

PROCESS FOR THE PREPARATION OF A PHOSPHORIC-ACID-CONTAINING ASPHALT/POLYMER MIXTURE AND RESULTING ASPHALT COMPOSITION THEREOF

FIELD OF THE INVENTION

The invention relates to a method of making an asphalt composition, especially an asphalt composition suitable for road construction.

BACKGROUND OF THE INVENTION

Asphalts are used in road construction. Asphalts containing phosphoric acid are known. Phosphoric acid is used to increase performance over a broad temperature range. That is, the asphalt in road usage, will not be too soft and malleable at high temperatures or too brittle at low temperatures. However, an anti-strip agent is typically added to asphalt to prevent loss of adhesion of the asphalt to aggregate and filler material during the service life of the road. Amine anti-strip agents undermine the temperature performance benefits of adding phosphoric acid to asphalt. Such a result is termed "fall-back" since the phosphoric acid increases the viscosity of the asphalt and the addition of the anti-stripping causes the viscosity of the asphalt to be reduced. It would be desirable to have a phosphoric acid-containing asphalt composition which did not lose its broad temperature range performance by addition of an anti-stripping agent.

SUMMARY OF THE INVENTION

A method of making an asphalt composition by mixing phosphoric acid with an asphalt base, resulting in an acid-asphalt mixture; blowing air through the acid-asphalt mixture, resulting in an acid-blown asphalt composition; mixing a terpolymer made from the concurrent reaction of ethylene, normal butyl acrylate, and glycidyl ester selected from glycidyl acrylate and glycidyl methacrylate according to U.S. Pat. No. 5,306,750, with the acid-blown asphalt composition, resulting in an glycidyl-functionalized polymer-containing acid-asphalt composition; and mixing an amine anti-strip additive with the glycidyl-functionalized polymer-containing acid-blown asphalt composition, resulting in a final asphalt composition; and recovering the final asphalt composition.

DETAILED DESCRIPTION OF THE PREFERRED EMBODIMENTS

A. Asphalt

A wide variety of asphalts can be utilized in the method of this invention. Such asphalts are described, e.g., in U.S. Pat. No. 5,306,750 column 3, which is incorporated herein by reference. In most cases, asphalt is a bottom product remaining after distillation of the crude oil. The asphalt is either an atmospheric or vacuum distilled asphalt depending on the corresponding distillation process that was utilized. In another type of asphalt lighter fractions or less severely distilled bottoms are mixed with a deeply flashed bottom material, to arrive at an asphalt having a desired viscosity or other desired parameters depending on the planned end usage of the asphalt. It is also known to obtain desired asphalt properties by adding aromatic-containing by-products of lubrication oil production. All of the above-disclosed base asphalts are known in the art. Optionally, the asphalt is acid-blown to result in an asphalt containing from about 0.05–5 percent by weight phosphoric acid. Any conventional acid-blown process may be used in this process.

B. Mixing Polymer with Asphalt

1. Description of Polymers

The polymers used in the method of this invention are described in U.S. Pat. No. 5,306,750, columns 3–5, which is incorporated herein by reference.

2. Mixture of the Polymer

The polymer is mixed with the asphalt at conditions as described in U.S. Pat. No. 5,306,750, columns 5–8, which is incorporated herein by reference. For purposes of this patent specification and claim, the mixture resulting from the mixture of asphalt and polymer is termed the first asphalt mixture. The polymer is mixed at a temperature of from about 100° C. to about 250° C. The amount mixed of epoxy-functionalized polymer is an amount sufficient to result in an epoxy-functionalized polymer-containing acid-asphalt composition which will have reduce fall-back upon addition of anti-strip. The amount preferably is from about 0.1–4 weight percent. More preferably, the amount mixed of epoxy-functionalized polymer is from about 0.5–1.5 weight percent.

C. Addition of Crude Oil Residue to Reduce Viscosity

Typically, a softer crude oil residue must be added to the acid-blown asphalt composition prior to adding the polymer. This is necessary to reduce the viscosity of the acid-blown asphalt composition, since the polymer will increase the viscosity. Any conventional crude oil residue can be used having a lower viscosity than the acid-blown polymer/asphalt mixture. The amount of crude oil residue mixed with the acid-blown asphalt composition is an amount sufficient to reduce the viscosity of the final polymer/asphalt mixture so that after addition of the anti-strip a road paving grade asphalt will result. Depending on the starting viscosity of the asphalt such amounts may vary from about 10–80 percent by weight.

D. Addition of Anti-Strip

The anti-strip is any conventional anti-strip compound. It is preferably an amine anti-strip compound. The anti-strip is mixed into the polymer/asphalt composition at a temperature from about 120° C. to about 180° C.

E. Final Asphalt Composition

The method of the invention results in a polymer-asphalt composition. The invention includes the asphalt described in the method above and an epoxy or glycidyl-functionalized polymer described in the method above.

ILLUSTRATIVE EMBODIMENTS AND COMPARATIVE EXAMPLES

A. Experimental Procedure

1. Asphalt Preparation

Asphalts A, B, C, and D were prepared from different crude oils. Asphalts A, B, C, D were prepared according to the following method. To a soft crude oil distillation residue approximately 300 pen (ASTM D5) approximately 2% phosphoric acid was added. The residue/acid blend was air-blown to a product of approximately 15–40 pen (ASTM D5) and approximately 70°–100° C. softening point (ASTM D36). The bases for Asphalts A and C were blended back (approximately 40%) with softer oil residues to a PG70 and a PG58 grade, respectively (AASHTO Performance Graded Binder Specification MP1). The blown bases of Asphalt B and Asphalt D were blended back (approximately 70% and 60%, respectively with residual oil residues) to result in a PG64 grade for both Asphalts B and D.

2. Adding Polymer

A polymer as described in the description above was added in the amounts indicated in the Tables below to portions of Asphalts A, B, C, and D. Low shear mixing was done at a temperature of 200°–210 ° C. Mixing occurred under nitrogen for about 2 hours.

3. Measurement of G*/sinō for Samples Without Anti-strip

The measurement was done according AASHTO TP5 to determine the G*/sinō for the samples of Asphalts A, B, C, and D without anti-strip. The results are given in Tables 1–4.

4. Addition of Anti-Strip

For each of Asphalts A, B, C, and D there was one sample not having any polymer content, and at least one sample having polymer content, as indicated in Tables 1–4. To each of these samples was added an amine anti-strip in the amounts indicated in Tables 1–4. The samples were mixed at a temperature of 160°–180° C. for about 30 minutes.

5. Measurement of G*/sinō for Samples With Anti-strip

The measurement was done according AASHTO TP5 to determine the G*/sinō for the samples of Asphalts A, B, C, and D with anti-strip. The results are given in Tables 1–4.

6. Results

The following tables show the results.

TABLE 1

|  | Asphalt A | Asphalt A and 3% wt. Polymer | Asphalt A with 0.5% anti-strip | Asphalt A with 0.5% anti-strip and 3% wt. polymer | % Fall Back |
| --- | --- | --- | --- | --- | --- |
| G*/sinō @ 70° C. | 1.07 kPa |  | 0.60 kPa |  | 44 |
| G*/sinō @ 76° C. |  | 4.164 kPa |  | 4.202 kPa | None |

TABLE 2

|  | Asphalt B | Asphalt B and 0.5% Polymer | Asphalt B and 1.0% Polymer | Asphalt B with 0.5% anti-strip | Asphalt B with 0.5% anti-strip and 0.5% wt. polymer | Asphalt B with 0.5% anti-strip and 1.0% wt. polymer | % Fall Back |
| --- | --- | --- | --- | --- | --- | --- | --- |
| G*/sinō @ 64° C. | 1.20 kPa |  |  | 1.08 kPa |  |  | 10 |
| G*/sinō @ 64° C. |  | 1.46 kPa |  |  | 1.42 kPa |  | 3 |
| G*/sinō @ 64° C. |  |  | 1.89 kPa |  |  | 1.82 kPa | 3 |

TABLE 3

|  | Asphalt C | Asphalt C and 1% wt. Polymer | Asphalt C with 0.5% anti-strip | Asphalt C with 0.5% anti-strip and 1% wt. polymer | % Fall Back |
| --- | --- | --- | --- | --- | --- |
| G*/sinō @ 70° C. | 0.42 kPa |  | 0.38 kPa |  | 10 |
| G*/sinō @ 76° C. |  | 0.60 kPa |  | 0.67 kPa | None |

TABLE 4

|  | Asphalt D | Asphalt D and 1% wt. Polymer | Asphalt D with 0.5% anti-strip | Asphalt D with 0.5% anti-strip and 1% wt. polymer | % Fall Back |
| --- | --- | --- | --- | --- | --- |
| G*/sinō @ 64° C. | 1.48 kPa |  | 1.21 kPa |  | 18 |
| G*/sinō @ 64° C. |  | 3.27 kPa |  | 2.96 kPa | 9 |

7. Experimental Conclusions

The following conclusions can be drawn from the above results. The addition of polymer reduces the asphalt fall-back when an amine anti-strip is added. Thus, phosphoric blown asphalts which previously would have a large drop in G*/sinō and viscosity upon addition of anti-strip now with the use of the method of this invention, will not do so.

What is claimed is:

1. In a process for preparing an asphalt composition comprising:

a) mixing an asphalt base resulting from the distillation of an asphaltic crude oil with 0.05 to 5 wt. % phosphoric acid, based on the weight of the asphalt, to produce an acid-asphalt composition;

b) mixing crude oil residues, having lower viscosities as compared to said acid-asphalt composition, with said acid-asphalt composition to thereby lower the viscosity of the acid-asphalt composition, and c) admixing from about 0.2 to 2 weight percent, based on the weight of the final asphalt composition produced in this process, an amine anti-strip additive with the acid-asphalt composition derived in step (b);

the improvement which comprises:

admixing with the asphalt composition from 0.5 to 2 weight percent, based on the weight of the acid-asphalt composition, a terpolymer derived from the concurrent reaction of ethylene, normal butyl acrylate and a glycidyl ester selected from the group consisting of glycidyl acrylate and glycidyl methacrylate to produce a glycidyl-functionalized polymer-containing acid asphalt composition.

2. The process of claim 1 wherein air is blown through said acid-asphalt to produce an acid blown asphalt composition to which said crude oil residue, functionalized polymer and amine anti-strip additives are added.

3. The process of claim 1 wherein said resultant acid-asphalt composition has a reduced fall-back as a result of the presence of the functionalized polymer in association with the anti-strip additive.

4. The process of claim 1 wherein the functionalized polymer is present in a range of from 0.1 to 4 weight percent.

5. The process of claim 1 wherein the functionalized polymer is present in a range of from 0.1 to 1.5 weight percent.

6. The process of claim 1 wherein the functionalized polymer is admixed at a temperature of from about 100° C. to about 250° C.

7. The process of claim 1 wherein the anti-strip additive is admixed at a temperature of from about 120° C. to about 180° C.

8. An asphalt composition comprising:

a) an atmospheric or vacuum distilled asphalt;

b) 0.05 to 5 weight percent phosphoric acid, based on the weight of the asphalt;

c) crude oil fractions having lower viscosities compared to said distilled asphalt;

d) 0.1 to 3.0 weight percent amine anti-strip additive, based on the weight of the produced asphalt composition; and e) 0.5 to 2.0 weight percent of a terpolymer comprising the reaction product of ethylene, normal butyl acrylate and a glycidyl ester selected from the group consisting of glycidyl acrylate and glycidyl methacrylate.

9. The composition of claim 8 wherein the asphalt composition contains entrained air.

* * * * *